United States Patent Office 3,560,588
Patented Feb. 2, 1971

3,560,588
3-AZABICYCLO[3.2.2]NON-3-YLTHIOCARBONYL DISULFIDES
John Joseph D'Amico, Dunbar, and Eiichi Morita, St. Albans, W. Va., assignors to Monsanto Company, St. Louis, Mo., a corporation of Delaware
No Drawing. Filed Jan. 30, 1968, Ser. No. 701,559
Int. Cl. C08f 27/06; C07d
U.S. Cl. 260—793       7 Claims

ABSTRACT OF THE DISCLOSURE

Compounds of the formula

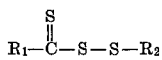

where $R_1$ and $R_2$ are amino radicals of one to sixteen carbon atoms selected from the group consisting of alkylamino, dialkylamino, and heterocyclicamino, at least one of $R_1$ and $R_2$ being 3-azabicyclo[3.2.2]non-3-yl, and their use for accelerating vulcanization of rubber are described.

---

The present invention relates to new compounds useful for accelerating the vulcanization of rubber.

The compounds of the present invention may be represented by the general formula:

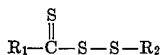

where $R_1$ and $R_2$ are amino radicals of one to sixteen carbon atoms, at least one of $R_1$ and $R_2$ being 3-azabicyclo[3.2.2]non-3-yl. The amino radicals comprise alkylamino, dialkylamino, and heterocyclicamino. Typical suitable examples of amino radicals are methylamino, ethylamino, propylamino, isopropylamino, butylamino, sec-butylamino, tert-butylamino, isobutylamino, amylamino, hexylamino, octylamino, nonylamino, decylamino, dodecylamino, dimethylamino, diethylamino, dipropylamino, diisopropylamino, dibutylamino, di-sec-butylamino, di-tert-butylamino, diisobutylamino, diamylamino, dihexylamino, dioctylamino, 1-pyrrolidinyl, piperidino, 5-ethyl-2-methylpiperidino, morpholino, 2,6-dimethylmorpholino, 3 - azabicyclo[3.2.2]non-3-yl, hexahydro-1H-azepin-1-yl, hexahydro-2H-azocin-1-yl, and octahydro-1H-azonin-1-yl.

The preparation and properties of typical compounds are described in detail below:

EXAMPLE 1

To a solution comprising 250 grams (2.0 moles) of 3-azabicyclo[3.2.2] nonane and 1500 ml. of petroleum ether was added dropwise at 0°–10° C. in one hour, a solution of 51.3 grams (0.5 mole) of freshly distilled sulfur dichloride in 200 ml. of petroleum ether. After stirring at 0°–10° C. for 3 hours, the product was collected by filtration, sucked dry, washed with 3 liters of water to remove by-product salt, and air-dried at 25°–30° C. The yield was 70.5% of 3,3'-thiobis(3-azabicyclo-[3.2.2]nonane) melting at 204°–206° C. after recrystallization from heptane. Analysis gave 10.12% nitrogen and 11.55% sulfur compared to 9.99% nitrogen and 11.43% sulfur calculated for $C_{16}H_{28}N_2S$.

A slurry comprising 28 grams (0.1 mole) of the above-described 3,3' - thiobis(3-azabicyclo[3.2.2]nonane) and 200 ml. of methyl alcohol was prepared and to it was added in one portion 8.4 grams (0.11 mole) of carbon disulfide. The reaction mixture was stirred and heated at reflux temperature for 20 minutes, stirred at 25°–30° C. for 2 hours, cooled to 0° C., and stirred at 0°–5° C. for 15 minutes. The product was collected by filtration and air-dried at 25°–30° C. 3 - azabicyclo[3.2.2]non-3-yl 3-azabicyclo[3.2.2]non-3-ylthiocarbonyl disulfide was obtained in 98% yield as a cream solid melting at 134°–135° C. after recrystallization from ethyl alcohol/ethyl acetate. Analysis gave 7.78% nitrogen and 27.10% sulfur compared to 7.86% nitrogen and 26.98% sulfur calculated for $C_{17}H_{28}N_2S_3$.

EXAMPLE 2

To a solution of 25.8 grams (0.25 mole) of sulfur dichloride in 100 ml. of carbon tetrachloride at a temperature of 4°–7° C. was added in 30 minutes a solution comprising 32 grams (0.25 mole) of 3-azabicyclo[3.2.2] nonane, 27.3 grams (0.27 mole) of triethylamine, and 200 ml. of carbon tetrachloride. After stirring for 30 minutes, the reaction mixture was added to a solution of 62.7 grams (0.25 mole) of the triethylamine salt of morpholinocarbodithiolic acid in 140 ml. of carbon tetrachloride at a temperature of 0°–10° C. The cooling means was removed and the reaction mixture stirred for 5 hours, then filtered to remove impurities, and the filtrate washed and dried. Carbon tetrachloride was removed under reduced pressure. The desired product crystallized after adding isopropanol and stirring. The product was extracted with ethyl ether and the insoluble impurities removed by filtration. Removal of ether in vacuo gave 3-azabicyclo[3.2.2]non-3-yl morpholinothiocarbonyl disulfide, a light yellow solid melting at 87°–90° C. Analysis gave 8.5% nitrogen and 30.43% sulfur compared to 8.80% nitrogen and gave 30.20% sulfur calculated for $C_{13}H_{22}N_2OS_3$.

EXAMPLE 3

To a stirred solution comprising 25.8 grams (0.25 mole) of sulfur dichloride in 150 ml. of carbon tetrachloride there was added in 40 minutes at a temperature of 3°–7° C., 21.8 grams (0.25 mole) of morpholine and 27.3 grams (0.27 mole) of triethylamine in 200 ml. of carbon tetrachloride and stirring continued for 30 minutes. Thereupon the reaction mixture was added to a solution of 75.6 grams (0.25 mole) of the triethylamine salt of 3-azabicyclo[3.2.2]non-3-ylcarbodithiolic acid in 150 ml. of carbon tetrachloride at a temperature of 8°–10° C. in 25 minutes and stirring continued for 5 hours. During this period the cooling means was removed. The reaction mixture was added to water, stirred for 5 to 10 minutes, the carbon tetrachloride separated, washed with water until neutral to litmus, and dried over sodium sulfate. After removal of carbon tetrachloride in vacuo, a viscous liquid was obtained. Upon addition of ether to the viscous liquid, a small amount of solids formed which were removed by filtration. Concentration of the ethereal solution yielded 3-azabicyclo[3.2.2]non-3-ylthiocarbonyl morpholino disulfide as an off-white solid melting at 103°–104° C. Analysis gave 8.32% nitrogen and 30.14% sulfur compared to 8.80% nitrogen and 30.20% sulfur calculated for $C_{13}H_{22}N_2OS_3$.

Vulcanization of rubber by use of typical compounds of the class of this invention is illustrated in the following tables. Rubber compositions were compounded comprising:

| | Parts by weight | |
|---|---|---|
| | Stock A | Stock B |
| Smoked sheets rubber | 100.0 | |
| SBR 1606* | | 162.0 |
| Carbon black | 50.0 | |
| Zinc oxide | 5.0 | 4.0 |
| Stearic acid | 3.0 | 2.0 |
| Saturated hydrocarbon softener | 3.0 | |
| Sulfur | 1.5 | 1.75 |
| Product of Example 1 | 0.5 | 0.8 |

*Styrene-butadiene rubber (100) plus high aromatic oil (10) plus high abrasion furnace black (52).

The stocks were cured by heating in a press for various periods of time at 144° C. for Stock A and at 153° C. for Stock B. The physical properties at optimum cures are set forth below:

TABLE I

| Stock: | Modulus of elasticity in lbs./in.$^2$ at 300% elongation | Tensile at break in lbs./in.$^2$ | Ultimate elongation, percent |
|---|---|---|---|
| A | 2,580 | 3,900 | 430 |
| B | 2,180 | 3,800 | 490 |

Copolymer rubber prepared from non-conjugated dienes can be used in the practice of the invention. Ethylene-propylene terpolymer is the well-recognized and commonly employed name applied to the polymerized product from a polymerization of ethylene, propylene, and a small quantity of a diene. The terpolymer used in the formulations below is known commercially as "Nordel 1040."

| | Parts by weight | |
|---|---|---|
| | Stock C | Stock D |
| Ethylene-propylene terpolymer | 100.0 | 100.0 |
| Zinc oxide | 5.0 | 5.0 |
| Carbon black | 80.0 | 80.0 |
| Aromatic processing oil | 40.0 | 40.0 |
| Sulfur | 1.5 | 1.5 |
| Product of Example 2 | 2.0 | |
| Product of Example 3 | | 2.0 |

The stocks were cured by heating in a press for various periods of time at 160° C. The physical properties at optimum cures are set forth below:

TABLE II

| Stock: | Modulus of elasticity in lbs./in.$^2$ at 300% elongation | Tensile at break in lbs./in.$^2$ | Ultimate elongation, percent |
|---|---|---|---|
| C | 1,880 | 3,200 | 480 |
| D | 1,900 | 3,000 | 450 |

The compounds of the class of this invention are effective vulcanizing agents for rubber without the presence of sulfur. Rubber compositions were compounded comprising:

| | Parts by weight | |
|---|---|---|
| | Stock E | Stock F |
| Smoked sheets rubber | 100.0 | 100.0 |
| Carbon black | 50.0 | 50.0 |
| Zinc oxide | 5.0 | 5.0 |
| Stearic acid | 3.0 | 3.0 |
| Saturated hydrocarbon softener | 3.0 | 3.0 |
| Product of Example 2 | 3.185 | |
| Product of Example 3 | | 3.185 |

The stocks were cured by heating in a press for various periods of time at 144° C. The physical properties at optimum cures are set forth below:

TABLE III

| Stock: | Modulus of elasticity in lbs./in.$^2$ at 300% elongation | Tensile at break in lbs./in.$^2$ | Ultimate elongation, percent |
|---|---|---|---|
| E | 2,000 | 3,480 | 460 |
| F | 1,900 | 3,400 | 480 |

Replacing the product of Example 2 in Stock E with 3.0 parts of the product of Example 1 and adding 0.5 part of accelerator, a modolus figure of 2980 lbs./in.$^2$ and a tensile figure of 3800 lbs./in.$^2$ were obtained.

These data indicate that the products of the present invention possess activity as vulcanization accelerators and are effective curing agents for rubber.

It is intended to cover all changes and modifications of the examples of the invention herein chosen for purposes of disclosure which do not constitute departures from the spirit and scope of the invention. The matter contained in each of the following claims is to be read as part of the general description of the present invention.

We claim:

1. A process of accelerating the vulcanization of rubber which comprises heating sulfur-vulcanizable diene rubber and sulfur with a compound of the formula

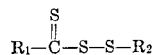

where $R_1$ and $R_2$ are amino radicals of one to sixteen carbon atoms selected from the group consisting of alkylamino, dialkylamino, and heterocyclicamino, at least one of $R_1$ and $R_2$ being 3-azabicyclo[3.2.2]non-3-yl.

2. A process of claim 1 wherein one of $R_1$ and $R_2$ is

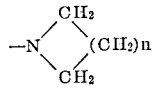

and $n$ is an integer at least two but less than seven.

3. A process of claim 1 wherein one of $R_1$ and $R_2$ is morpholino.

4. A process of claim 1 wherein $R_1$ and $R_2$ are 3-azabicyclo[3.2.2]non-3-yl.

5. A process of claim 4 wherein the rubber is natural rubber.

6. A process of vulcanizing sulfur-vulcanizable diene rubber which comprises heating said rubber with a vulcanizing amount of a compound of the formula

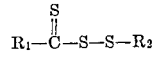

where $R_1$ and $R_2$ are amino radicals of one to sixteen carbon atoms selected from the group consisting of alkylamino, dialkylamino, and heterocyclicamino, at least one or $R_1$ or $R_2$ being 3-azabicyclo[3.2.2]non-3-yl.

7. A process of claim 6 wherein the rubber is natural rubber.

References Cited

UNITED STATES PATENTS 2,888,445   5/1959   Hardman _____ 260—79.5

JOSEPH L. SCHOFER, Primary Examiner

C. A. HENDERSON, Jr., Assistant Examiner

U.S. Cl. X.R.

260—79.5, 239, 567, 784